United States Patent [19]

Miwa

[11] Patent Number: 4,755,491

[45] Date of Patent: Jul. 5, 1988

[54] MANUFACTURING METHOD FOR AN ALUMINUM NITRIDE SINTERED BODY

[75] Inventor: Sachihiko Miwa, Ichikawa, Japan

[73] Assignee: Onoda Cement Company, Ltd., Onoda, Japan

[21] Appl. No.: 12,651

[22] Filed: Feb. 9, 1987

[30] Foreign Application Priority Data

Feb. 10, 1986 [JP] Japan .................................. 61-25794

[51] Int. Cl.$^4$ ............................................. C04B 35/58
[52] U.S. Cl. ........................................ 501/96; 501/153
[58] Field of Search ............................ 501/96, 153, 98

[56] References Cited

U.S. PATENT DOCUMENTS 3,577,245  5/1971  Quandt .................................. 501/96

Primary Examiner—William R. Dixon, Jr.
Assistant Examiner—Anthony Green
Attorney, Agent, or Firm—Wenderoth, Lind & Ponack

[57] ABSTRACT

A manufacturing method for an aluminum nitride sintered body comprises admixing an additive selected from calcium cyanamide, calcium cyanide, and mixtures thereof with aluminum nitride powder, forming the mixture into a formed body, and sintering the formed body in a non-oxidizing atmosphere. The resulting aluminum nitride sintered body has a high thermal conductivity.

3 Claims, No Drawings

MANUFACTURING METHOD FOR AN ALUMINUM NITRIDE SINTERED BODY

BACKGROUND OF THE INVENTION

This invention relates to an aluminum nitride sintered body, and particularly to a manufacturing method for an aluminum nitride sintered body which has good thermal conductivity.

In recent years, as electronic devices have undergone enormous increases in speed and performance along with decreases in size and weight, the dissipation of the heat generated by semiconductor elements in these devices has become a major problem. In particular, in high-density packaged IC's, LSI's, microwave transistors for microwave and optical communication, laser diodes, and the like, there is a great demand for a base material which has high thermal conductivity.

In the past, alumina sintered bodies have been widely used as electrically-insulating base materials, but their ability to dissipate heat is inadequate for recent electronic devices, and therefore an electrically-insulating base material having improved thermal conductivity is needed.

One material which has been viewed with much interest as a base material having high thermal conductivity is aluminum nitride. Its electrical resistance, dielectric strength, dielectric constant, bending strength, coefficient of thermal expansion, and other properties which are important for an electrically-insulating base material are comparable or superior to those of alumina sintered bodies, and accordingly it has been the subject of extensive research.

However, aluminum nitride is difficult to sinter, particularly alone at normal pressures. For this reason, manufacturing methods for sintered bodies using hot pressing and manufacturing methods for sintered bodies which are performed at normal pressures by the addition of various oxides as auxiliaries are being studied. Among these methods, sintering methods performed at normal pressures are preferable since they are better suited to large-scale production. One such sintering method is that disclosed in Japanese Patent Laid-Open No. 54-100410, which is a sintering method for aluminum nitride in which a sintering auxiliary such as calcium oxide (CaO), barium oxide (BaO), or strontium oxide (SrO) is added. However, the thermal conductivity of an aluminum nitride sintered body obtained by that method is only 50-60 W/mK, and therefore a manufacturing method for an aluminum nitride sintered body having a higher thermal conductivity has been searched for.

Japanese Patent Laid-Open No. 60-151280 discloses a manufacturing method for sintered aluminum nitride in which an acetylide of calcium, magnesium, barium, strontium, or the like is used as an auxiliary, and Japanese Patent Laid-Open No. 60-186478 discloses a sintering method in which a nitride of calcium, magnesium, barium, strontium, or the like is added. However, the auxiliaries which are used in those two methods are extremely unstable in air. For example, calcium acetylide, which is used in No. 60-151280, reacts violently with water. If calcium acetylide having a grain size of finer than 150 mesh is left in air for one hour, all of it will break down to form $Ca(OH)_2$. Furthermore, if calcium nitride, which is used in No. 60-186478, having an average particle diameter of 3 microns is exposed to air, it will immediately break down into $Ca(OH)_2$.

It is conceivable to prevent this breakdown by handling the auxiliaries so that they will not be exposed to water or air, but in actual practice, it is extremely difficult and expensive to prevent breakdown during the various steps (grinding, mixing, forming, dewaxing, and sintering) in the manufacture of a base material.

SUMMARY OF THE INVENTION

It is an object of the present invention to provide a manufacturing method for sintered aluminum nitride, the resulting sintered aluminum nitride having a high thermal conductivity.

It is another object of the present invention to provide a manufacturing method for sintered aluminum nitride which can be performed at normal pressure.

In a manufacturing method according to the present invention, calcium cyanamide ($CaCN_2$), calcium cyanide [$Ca(CN)_2$], or a mixture thereof is admixed with aluminum nitride powder. The resulting mixture is formed and then sintered in a nonoxidizing atmosphere.

DESCRIPTION OF THE PREFERRED EMBODIMENTS

Hereinbelow, a manufacturing method in accordance with the present invention will be described in detail.

In the present invention, an additive in the form of calcium cyanamide, calcium cyanide, or a mixture thereof is admixed with aluminum nitride powder. This additive promotes the sintering of aluminum nitride and removes oxygen present in the aluminum nitride powder. This is evidenced by the fact that the amount of oxygen in a sintered body according to the present invention is less than the amount of oxygen in the aluminum nitride powder prior to sintering. The amount of the additive which is admixed is preferably 0.1-7 parts by weight and more preferably 0.5-4 parts by weight per 100 parts by weight of the aluminum nitride powder. If the amount of additive is less than 0.1 parts by weight, it does not produce the desired effect. Namely, sintering does not proceed, and there is no increase in thermal conductivity. On the other hand, if the amount of additive which is admixed is in excess of 7 parts by weight, the density of the sintered body abruptly falls and its thermal conductivity also decreases. Furthermore, if the amount of additive is too great, carbon, which does not contribute to the reaction, remains between the particles of aluminum nitride, and it is thought that the carbon acts as an impediment to sintering.

The additive used in the present invention reacts with moisture in the air and gradually changes into oxides, but it is stable in nonaqueous solvents. Therefore, after addition of the additive, it is desirable that grinding and mixing be performed in a nonaqueous solvent.

After addition of the additive to the aluminum nitride powder, the mixture should be adequately mixed and ground. At this time, for the reasons stated above, it is best to add a nonaqueous solvent such as acetone or trichloroethane to the mixture. When employing a nonaqueous solvent, after mixing and grinding, the nonaqueous solvent should be removed by a method such as vacuum drying. The resulting powder mixture is then formed under pressure at room temperature to obtain formed bodies of a prescribed shape such as tablets or pellets. The formed bodies are then sintered at a high temperature in a vacuum or in a non-oxidizing atmosphere of nitrogen gas, hydrogen gas, carbon monoxide gas, or the like. The sintering can be performed in a temperature range of 1500°–1900° C., but a sintering temperature of 1550°–1900° C. is most suitable. The sintering time is usually from 30 minutes to 3 hours.

A manufacturing method according to the present invention will now be further explained by the following working examples, which are presented merely for the purpose of illustration and do not limit the scope of the invention in any way.

EXAMPLES 1–6

100 parts by weight of aluminum nitride powder having an average particle diameter of approximately 3 microns were placed into a polyethylene container. Various amounts of an additive in the form of calcium cyanamide having an average particle diameter of roughly 30 microns were added to the aluminum nitride powder. The amounts of calcium cyanamide which were used are shown in Table 1. Acetone equal in weight to three times the total weight of the aluminum nitride and the calcium cyanamide was added thereto and mixing was performed. Grinding was then carried out using a vibrating mill, after which the mixture was formed under a pressure of 1000 kg per square centimeter into cylindrical tablets having a diameter of 20 mm and a height of 4 mm. The tablets were then sintered in a nitrogen gas atmosphere at 1800° C. for 2 hours to obtain aluminum nitride sintered bodies. The sintering was performed in a high-frequency heating furnace. First, the tablets were placed into the furnace, the furnace was sealed, the pressure inside it was reduced to 0.1 torr, nitrogen gas was charged into the furnace, and the tablets were heated.

After sintering, the thermal conductivity of the resulting sintered bodies was determined using an apparatus for measuring thermophysical properties by the laser flash method (Model PS-7) manufactured by Rigaku Denki Company of Japan. The value of thermal conductivity was calculated from the values of specific heat and diffusivity of heat measured by the laser flash method. The calculated values of thermal conductivity for the resulting aluminum nitride sintered bodies are shown in Table 1.

COMPARATIVE EXAMPLES 1–2

Sintered bodies were prepared by the same method as for Examples 1–6 using calcium cyanamide as an additive. However, the amounts of calcium cyanamide which were admixed fell outside of the range of the present invention. The thermal conductivity of the resulting sintered bodies is shown in Table 1.

TABLE 1

| Example Number | Amount of Additive (parts by weight) | Relative Density of Sintered Body (%) | Thermal Conductivity (W/mK) |
| --- | --- | --- | --- |
| Present Invention | | | |
| 1 | 0.1 | 97 | 70 |
| 2 | 0.5 | 98 | 90 |
| 3 | 2.0 | 99.5 | 135 |
| 4 | 2.5 | 99 | 110 |
| 5 | 4.0 | 98.5 | 80 |
| 6 | 7.0 | 98 | 70 |
| Comparative Examples | | | |
| 1 | 10.0 | 95 | 40 |
| 2 | 0.02 | 96 | 50 |

As can be seen from the results for Examples 1–6 in Table 1, by the addition of 0.1–7 parts by weight of an additive, aluminum nitride sintered bodies having a thermal conductivity of at least 70 W/mK were obtained. In contrast, for Comparative Examples 1 and 2 in which the amount of additive fell outside of this range, the thermal conductivity was only 50 W/mK at the most.

EXAMPLE 7

1 part by weight of calcium cyanide and 1 part by weight of calcium cyanamide were added to 100 parts by weight of aluminum nitride powder. After mixing and grinding, the mixture was formed into formed bodies of a prescribed shape, and the formed bodies were sintered at 1750° C. for 2 hours. The resulting aluminum nitride sintered bodies had a high thermal conductivity of 100 W/mK.

EXAMPLE 8

1.5 parts by weight of calcium cyanide were added to 100 parts by weight of aluminum nitride powder. After mixing and grinding, the mixture was formed into formed bodies of a prescribed shape, and the formed bodies were sintered at 1750° C. for 2 hours. The resulting aluminum nitride sintered bodies had a thermal conductivity of 90 W/mK.

As can be seen from the above examples, since a manufacturing method according to the present invention employs calcium cyanamide, calcium cyanide, or a mixture thereof as an additive which does not contain oxygen, it is not necessary to employ a special aluminum nitride powder having a low oxygen content, and a sintered body having high thermal conductivity can be obtained using a general-purpose aluminum nitride powder.

What is claimed is:

1. A method for manufacturing an aluminum nitride sintered body consisting essentially of:
    admixing an additive selected from calcium cyanamide, calcium cyanide, and mixtures thereof with aluminum nitride powder;
    forming the resulting mixture to obtain a formed body; and
    sintering said formed body in a non-oxidizing atmosphere at normal pressure.
2. A manufacturing method as claimed in claim 1, wherein 0.1–7 parts by weight of said additive are admixed per 100 parts by weight of said aluminum nitride powder.
3. A manufacturing method as claimed in claim 1, wherein 0.5–4 parts by weight of said additive are admixed per 100 parts by weight of said aluminum nitride powder.

* * * * *